Patented Sept. 20, 1938

2,130,783

UNITED STATES PATENT OFFICE 2,130,783

PLASTIC COMPOSITION

Earl C. Sherrard, Edward Beglinger, and John P. Hohf, Madison, Wis., and Ernest Bateman, deceased, late of Madison, Wis., by William T. Bateman, special administrator, Madison, Wis., assignors to Henry A. Wallace, Secretary of Agriculture of the United States of America No Drawing. Application January 28, 1938, Serial No. 187,569

7 Claims. (Cl. 260—209)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government of the United States of America for governmental purposes, without the payment to us of any royalty thereon.

Our invention relates to a process for treating sawdust or bagasse or other vegetable fibrous materials in such a manner as to materially change the composition of the ligno-cellulose complex, rendering it suitable for molding with or without a plasticizer, and to the product resulting from such a process.

An object of our invention is a method of treatment of sawdust, wood waste, straw, bagasse, and similar vegetable fibrous materials for the production of a plastic.

Another object is the production of a plastic resulting from the treatment of sawdust, bagasse, and other vegetable fibrous materials with aniline, which plastic material, when subjected to heat and pressure, results in a hard, dense, vitreous-like product that is high in strength, moisture-, and water-resistance, and that answers as an excellent dielectric.

The moldable ligno-cellulose is produced by treating the vegetable fibrous material with water and aniline or other basic organic material at elevated temperatures and pressures with or without the addition of a mineral acid.

We find that when a mixture of aniline and vegetable fibrous material is digested in the presence of water, a combined reaction takes place in such a manner that an aniline-ligno-cellulose complex is formed together with the production of free acetic and formic acids and that the original basic mixture becomes strongly acid. The yield of the valuable material may be from 85 to 95 percent of the original vegetable fibrous material compared to a yield of 60 to 70 percent from an ordinary water-acid hydrolysis. This material, when washed free of water-soluble reaction products, thence ground to a suitable fineness, and thence plasticized with furfural or other suitable lignin plasticizer, can be molded under heat and pressure, forming a very hard, dense, black, shiny molded product which has good strength and a high degree of water and electrical resistance. A typical example will make clear the process of producing the ligno-cellulose-aniline compound, although we do not wish to limit ourselves to the single set of conditions and proportions of material given in the example, which is given by way of illustrating our invention.

*Example 1.*—One hundred parts of vegetable fibrous material, such as wood waste or bagasse, of a fineness sufficient to permit penetration of the cooking liquids, is placed in a pressure digester with substantially 100 parts of water and substantially 20 parts of aniline; the mixture is then heated at about 160 pounds per square inch steam pressure for, say, 3 hours, after which time the steam pressure is released, the material is removed from the digester, and the water-soluble reaction products removed by washing with water. The washed material is then dried and ground to a fineness suitable for molding.

The process described above can be varied by changing the amount of aniline or other basic organic materials, and/or any of the other variables such as temperature, time, or catalyst, which would result in materials such as described above.

*Example 2.*—To 100 parts of the aniline-ligno-cellulose compound of Example 1, we may add substantially 7 parts of furfural or other lignin plasticizer. The material is then suitable for molding by heat, say, at 135° to 190° C., and pressure, say, at 1,500 to 3,500 pounds per square inch.

*Example 3.*—To 100 parts of the aniline-ligno-cellulose compound of Example 1, we may add water to a total moisture content of substantially 10 to 20 percent. The material is then suitable for molding by heat, say, at 135° to 190° C. and pressure, say, at 1,500 to 3,500 pounds per square inch.

Having thus described our invention, what we claim for Letters Patent is:

1. A method for producing a ligno-cellulose-aniline composition possessing the essential properties of plastic flow under heat and pressure, which comprises adding aniline and water to vegetable fibrous materials, thence subjecting this mixture to the action of heat and pressure, thence recovering the excess aniline, thence copiously washing, and thence drying.

2. A method for producing a ligno-cellulose-aniline composition possessing the essential properties of plastic flow under heat and pressure, which comprises adding water and aniline to vegetable fibrous materials, thence subjecting this mixture to the action of heat and pressure, thence copiously washing, and thence drying.

3. A method for producing a ligno-cellulose-aniline composition possessing the essential properties of plastic flow under heat and pressure, which comprises adding water and aniline to vegetable fibrous materials, thence subjecting this mixture to the action of heat and pressure, thence copiously washing, and thence drying to a moisture content of substantially 10 to 20 percent, and thence grinding to a fineness suitable for molding.

4. A ligno-cellulose-aniline composition which was obtained from the treatment of vegetable fibrous materials with aniline and water at elevated temperatures and pressures, and from which the water solubles had been removed, which dried material has the property of plastic flow under heat and pressure in the presence of a suitable plasticizer.

5. A plastic composition, capable of being molded under heat and pressure into hard, dense, vitreous-like products, consisting of the product of claim 1, and containing furfural as the plasticizer.

6. A plastic composition, capable of being molded under heat and pressure into hard, dense, vitreous-like products, consisting of the product of claim 3, the residual moisture acting as the plasticizer.

7. A plastic composition, capable of being molded under heat and pressure into hard, dense, vitreous-like products, consisting of the product of claim 1, and containing a suitable plasticizer.

EARL C. SHERRARD.
EDWARD BEGLINGER.
JOHN P. HOHF.
WILLIAM T. BATEMAN,
Special Administrator of Ernest Bateman, Deceased.